(12) United States Patent
Harris et al.

(10) Patent No.: US 10,922,349 B1
(45) Date of Patent: Feb. 16, 2021

(54) FILTERING REMOTE ACCESS MONITORING DATA

(71) Applicant: Amazon Technologies, Inc., Seattle, WA (US)

(72) Inventors: Wendy M. Harris, Seattle, WA (US); Muhammad Tanvir Anwar, Seattle, WA (US); Michael Ellsworth Bundy, Shoreline, WA (US); Stephen Weber Crow, Sherwood, OR (US); Ariel Grob Dos Santos, Seattle, WA (US); Brian A. Michalowski, Seattle, WA (US); Joshua Roth, Pacific Palisades, CA (US); Jamie Siminoff, Pacific Palisades, CA (US)

(73) Assignee: Amazon Technologies, Inc., Seattle, WA (US)

(*) Notice: Subject to any disclaimer, the term of this patent is extended or adjusted under 35 U.S.C. 154(b) by 317 days.

(21) Appl. No.: 15/955,463

(22) Filed: Apr. 17, 2018

(51) Int. Cl.
| | | |
|---|---|---|
| *G06F 16/435* | (2019.01) | |
| *H04N 7/18* | (2006.01) | |
| *G06K 9/00* | (2006.01) | |
| *G06F 16/41* | (2019.01) | |
| *G06F 16/44* | (2019.01) | |

(52) U.S. Cl.
CPC ............ *G06F 16/435* (2019.01); *G06F 16/41* (2019.01); *G06F 16/447* (2019.01); *G06K 9/00771* (2013.01); *H04N 7/18* (2013.01)

(58) Field of Classification Search
CPC ..................................................... G06F 16/435
See application file for complete search history.

(56) References Cited

U.S. PATENT DOCUMENTS

| | | | | |
|---|---|---|---|---|
| 2009/0008450 A1* | 1/2009 | Ebert | ....................... | G07C 9/28 235/439 |
| 2016/0364679 A1* | 12/2016 | Cao | ....................... | G06Q 50/30 |
| 2018/0068266 A1* | 3/2018 | Kirmani | ............... | G01G 19/005 |

\* cited by examiner

*Primary Examiner* — Van H Oberly
(74) *Attorney, Agent, or Firm* — Knobbe, Martens, Olson & Bear, LLP (57) ABSTRACT

Features are disclosed for filtering and presenting specific portions of monitoring data associated with specific events. The features may include: (1) receiving time stamp information from delivery partner; (2) filtering or receiving filtered feed of monitoring data such as audio or video data; and (3) providing notification to a user including the specific portion of the monitoring data. Where the monitoring data is ambiguous or disrupted, the analysis may be offloaded to a manual review process to avoid false-positives.

20 Claims, 6 Drawing Sheets

FILTERING REMOTE ACCESS MONITORING DATA

BACKGROUND

Item deliveries often require the presence of a person to receive the item. If no one is available to receive the item, subsequent attempts may be made to deliver the item. Alternatively, the item may be left at or near the physical delivery location. In this case, the item may be damaged such as by weather or wildlife. The item may be stolen as it waits for the intended recipient. Some locations may include a monitoring device which captures monitoring data such as audio, still images, or video of the physical delivery location. A user can then review the monitoring data to determine what happened at the physical location.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

One challenge with viewing the monitoring data is the need to store and transmit potentially large quantities of monitoring data from a storage to a client device. In the case of high definition video, this can be resource intensive for the client device and network paths used to transmit the video data.

Described are features for filtering monitoring data to associate a specific portion of the monitoring data for a physical location with a specific delivery event at the physical location. The solution reduces the amount of monitoring data transmitted in response to a request for information about the delivery.

Figure 1:
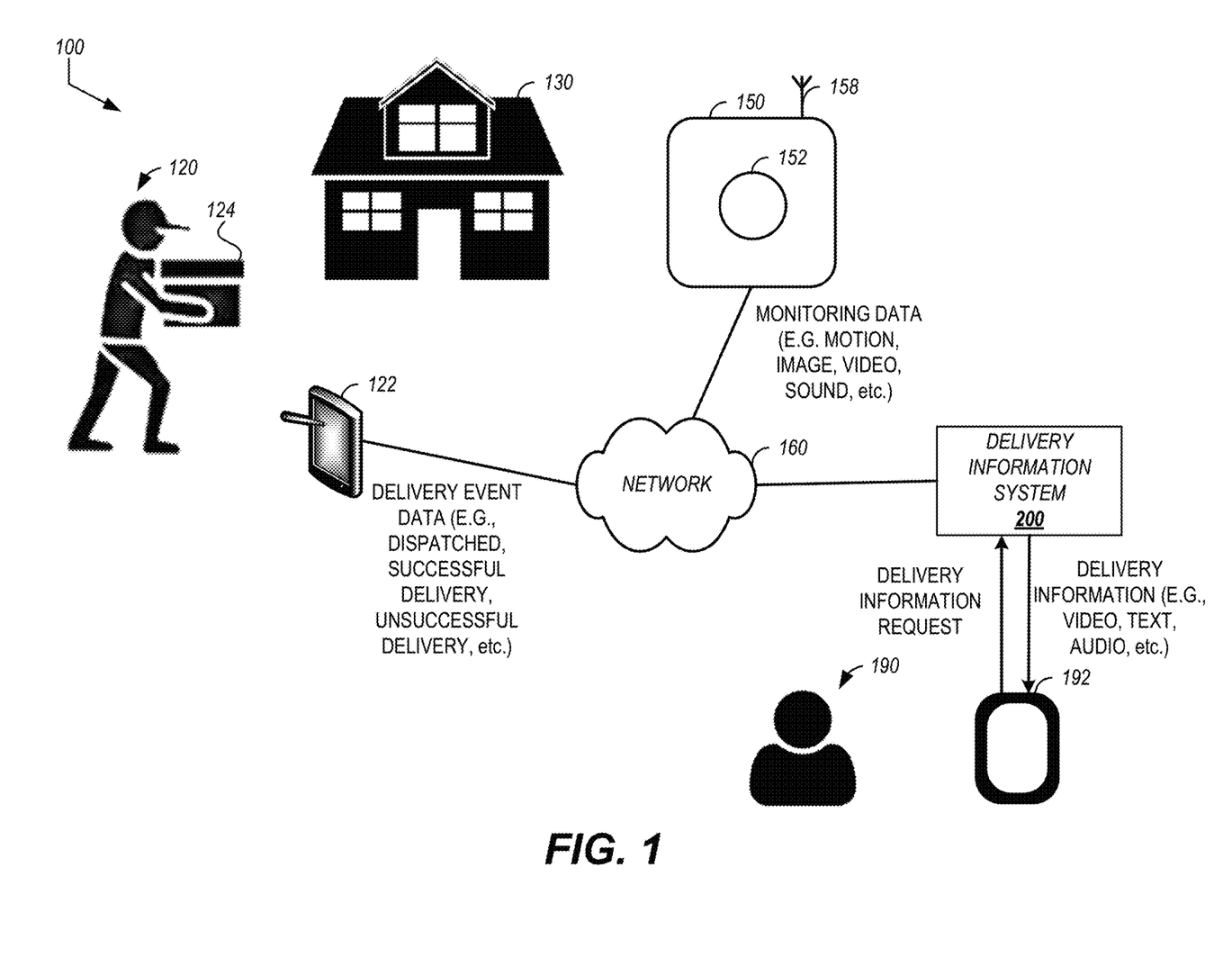
FIG. 1 is a block diagram showing an example environment including a delivery status server.

FIG. 1 is a block diagram showing an example environment including a delivery status server. The environment 100 may include a delivery device 122. The delivery device 122 may be an electronic communication device configured to transmit machine readable messages such as to a delivery system that may track delivery status for items. Non-limiting examples of the delivery device 122 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other portable electronic device or appliance. The messages may be formatted according to a standardized protocol such as TCP/IP, HTTP, FTP, or the like. The transmission may be sent via wireless or hybrid wired-wireless networks. The machine readable messages may include delivery event data. Examples of delivery event data include information indicating: an item was dispatched, an item was successfully delivered, delivery of an item was attempted by unsuccessful, time of the deliver event, custom notes about the delivery event (e.g., "left item with neighbor"), or information associated with a delivery agent 120 that transmitted the delivery event data.

The delivery agent 120 may interact with one or more interfaces presented via the delivery device 122. The interfaces may include control elements to receive input or adjust a function of the delivery device 122. For example, the delivery device 122 may include a camera or other optical scanning element. The delivery device 122 may activate the camera to scan an item 124 to be delivered. For example, the item 124 may include a scannable code or other detectable indicator. The scannable code may encode or indicate an identifier for the item or delivery information related to the item such as address, unique identifier of a monitoring device 150, or other information used in identifying or delivering the item 124.

The monitoring device 150 may be implemented as a camera, a microphone, or other monitoring data collection device. The monitoring device 150 may be placed to monitor the physical location 130. In some implementations, the monitoring device 150 may be place near a door. The monitoring device 150 may be placed behind the door or in an area in front of the door. The monitoring device 150 may be placed indoors or outdoors. The monitoring device 150 preferably collects data to identify entry and exit activity at the delivery location. The monitoring device 150 may include a proximity or motion sensor to initiate the capturing of monitoring data. Over the course of a day, the monitoring device 150 may detect a variety of stimuli to initiate and capture monitoring data such as the comings and goings of the residents of the physical location 130, animals or pets at the physical location 130, mail carriers or other service providers, in addition to the delivery agent 120. In some instances, the physical location 130 configured to be monitored by the monitoring device 150 may be referred to a monitored location. The sensitivity of the proximity detector may also cause the monitoring device 150 to capture monitoring data in response to non-events such as changes in light, falling leaves, wind gusts, or other ambient changes in the environment. In this way, a large body of monitoring data may be provided by the monitoring device 150.

The monitoring device 150 may transmit monitoring data such as image data, video data, audio data, or the like collected by a sensor 152 of the monitoring device 150. The monitoring data (e.g., captured image data, video, etc.) may be transmitted via a wireless transceiver 158, via a network 160. In some implementations, the monitoring data may be transmitted to a delivery information system 200. In some implementations, the monitoring data may be transmitted to a monitoring data store 215 accessible by the delivery information system 200. The monitoring data store 215 may be implemented as an image repository.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service or other structured, semi-structured, or unstructured data repository.

The delivery information system 200 may transmit delivery information to an access device 192 associated with a recipient 190. The access device 192 may be an electronic communication device configured to transmit and receive machine readable messages such as email, text messages, messages to activate an application or function of the access device 192, or delivery status information, including monitoring data, as described herein. Non-limiting examples of the access device 192 include a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. The messages may be formatted according to a standardized protocol such as TCP/IP, HTTP, FTP, or the like. The transmission may be sent wired, wireless, or hybrid wired-wireless networks.

The access device 192 may present an interface including one or more control elements to receive delivery information status request inputs. The status request inputs may include one or more of item, delivery, or location information for which delivery status is requested. In some implementations, the access device 192 may receive an input indicating acceptance of notifications such as delivery event notifications. In such instances, the delivery information may be provided without an express request such as via push notifications. Transmission of the notification including the delivery information may be triggered upon receipt of delivery event data from the delivery device 122.

Figure 2:
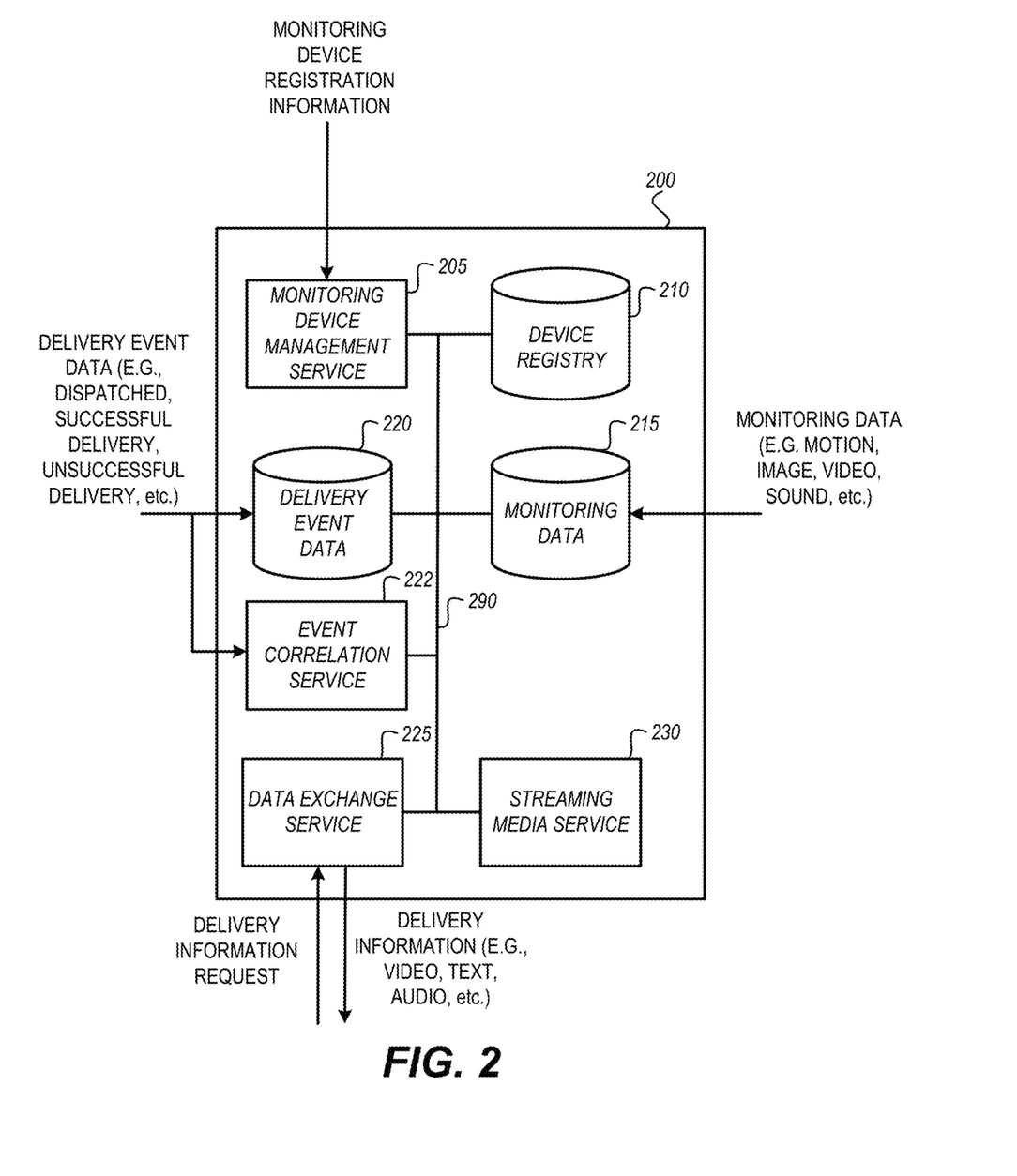
FIG. 2 is a diagram showing an illustrative delivery information system.

FIG. 2 is a diagram showing an illustrative delivery information system. The delivery information system 200 may include a monitoring device management service 205. The monitoring device management service 205 may receive monitoring device registration information. The monitoring device registration information may include an identifier for the monitoring device 150, information identifying the physical location 130, and information associated with the recipient 190. The information associated with the recipient 190 may include account information which can be used to request items for delivery. As such, the monitoring device management service 205 can associate the monitoring device 150 with the physical location 130 or the recipient 190.

The monitoring device registration information may be stored in a device registry data store 210. The device registry data store 210 may be a specially architected data store for efficient storage and retrieval of monitoring device information. One way to expedite the storage and retrieval is through intelligent indexing. Indexing generally refers to a process of analyzing stored data to generate information to quickly identify particular records within the registry. In the case of monitoring device information, it may be desirable to index the device registry data store 210 by the identifier for the monitoring device 150. It may be desirable to maintain a second index by physical location or recipient information to facilitate identification of the monitoring device associated therewith.

The delivery information system 200 may include the monitoring data store 215. The monitoring data store 215 may be a specially architected data store for efficient storage and retrieval of monitoring data. As discussed, the monitoring data may include media files or streaming media data. The monitoring data may include event data such as motion detection events. The event data may be accompanied by temporal information to indicate when the event occurred. The event data may also include the identifier for the monitoring device that detected the event. The monitoring data may be indexed by the monitoring device identifier to expedite the storage and retrieval of monitoring data.

The delivery information system 200 may include a delivery event data store 220. The delivery event data store 220 may be a specially architected data store for efficient storage and retrieval of delivery event data. The delivery event data may be received from a delivery device such as the delivery device 122 shown in FIG. 1. The delivery event data may include temporal information indicating when the event occurred. The delivery event data may include an identifier for the item or delivery associated with the event. The delivery event data may be indexed by the recipient identifier to expedite the storage and retrieval of delivery events for reporting delivery status.

An event correlation service 222 may be included in the delivery information system 200. The event correlation service 222 may monitor communications received by the delivery information system 200 to detect receipt of new delivery event data. Upon receipt of a delivery event, the event correlation service 222 may begin a process to associate the delivery event with available monitoring data. The association may include filtering the monitoring data to a period of time associated with the delivery event. The association may include analyzing the portion of monitoring data during the period of time to determine whether a delivery event occurred. For example, if the delivery event was a package delivery to a home, the monitoring data may include an audible ring representing the delivery agent ringing the doorbell. If no doorbell is detected through audio analysis of the portion of the monitoring data, then the delivery event may not be associated with the identified portion. The analysis may include comparing metadata for the monitoring data with metadata associated with deliveries. For example, some monitoring data may include tags such as "human detected" or "pet detected." If the portion of monitoring data does not include detection of a human, then it is unlikely that the portion of monitoring data is associated with the delivery event. The characteristics and thresholds for correlating events with monitoring data may be specified in a configuration accessible by the event correlation service. The configuration may be established based on one or more of a user preference, a monitoring device type, a delivery event type, or a monitoring data type.

The event correlation service 222 is shown as receiving the delivery event data in parallel with the delivery event data store 220. In some implementations, the event correlation service 222 may monitor the delivery event data store 220 for new events. If a new event is stored in the delivery event data store 220, the event correlation service 222 may queue the new event for analysis and processing as described.

A data exchange service 225 may be included in the delivery information system 200 to process delivery information requests, such as from an access device of a recipient. A delivery information request may include information identifying a recipient or a specific delivery. In the case where the request identifies a recipient, delivery information for a predetermined number of deliveries may be provided. For example, information for the most recent two, three, five, or ten deliveries may be provided. Specifying a recipient may indicate authorization for push notifications for delivery events associated with the recipient. In such instances, once authorized, the delivery information system 200 may provide delivery information without a further request from the recipient for events associated with the recipient.

Providing the delivery information may include transmitting information from or based on one or more delivery events. Providing the delivery information may include transmitting information from or based on monitoring data. The delivery information may be provided via a graphical user interface. The response to the delivery information request may include machine readable instructions for generating and presenting the graphical user interface. In some implementations, it may be desirable to provide a stream of multimedia data such as audio or video monitoring data related to the delivery event. For example, a recipient may wish to view a video of a delivery agent delivering an item. To expedite the identification of the appropriate portion of the monitoring data showing the delivery of the item, the monitoring data may be processed to include an identifier associating the portion with a delivery event. The identifier may be metadata or other information generated by the event correlation service 222. When providing the monitoring data, it may be desirable to provide a network location for the monitoring data. The network location may be accessed by a device to view the monitoring data. The network location may be associated with a streaming media service 230.

The streaming media service 230 may be included to retrieve the portion of monitoring data associated with a delivery event from the monitoring data store 215 and provide the media to the requesting device. In some implementations, the streaming media service 230 may process the monitoring data prior to transmission to further improve the speed and resource utilization for transmitting the monitoring data. For example, if the requesting device includes a small display (e.g., a smartphone), the streaming media service 230 may reduce the size of video monitoring data to correspond to the aspect ratio of the requesting device.

The services and data stores shown in FIG. 2 are included within the delivery information system 200. The elements may be communicatively coupled using a bus 290. The bus 290 may permit information to be transferred between the elements shown.

In some implementations, it may be desirable to separate one or more of the elements from the delivery information system 200 and include a communication channel between the delivery information system 200 and separated elements. For example, the monitoring device 150 may be registered with a monitoring service provider such as a security service or networked data storage provider. In such instances, the delivery information system 200 may integrate with the monitoring service to identify and obtain monitoring data related to a delivery event. The monitoring service may host the monitoring device management service 205, the device registry data store 210, or a monitoring data store including the monitoring data received from the monitoring device 150.

In some implementations, the device registry data store 210 may include authorization information for a physical location. The authorization information may be received from a device associated with the physical location. Using the device, a user at the physical location can specify whether access to the monitoring data received for the physical location may be accessed such as by the delivery information system 200. The access control allows further granularity in how and when monitoring data may be accessed.

Figure 3:
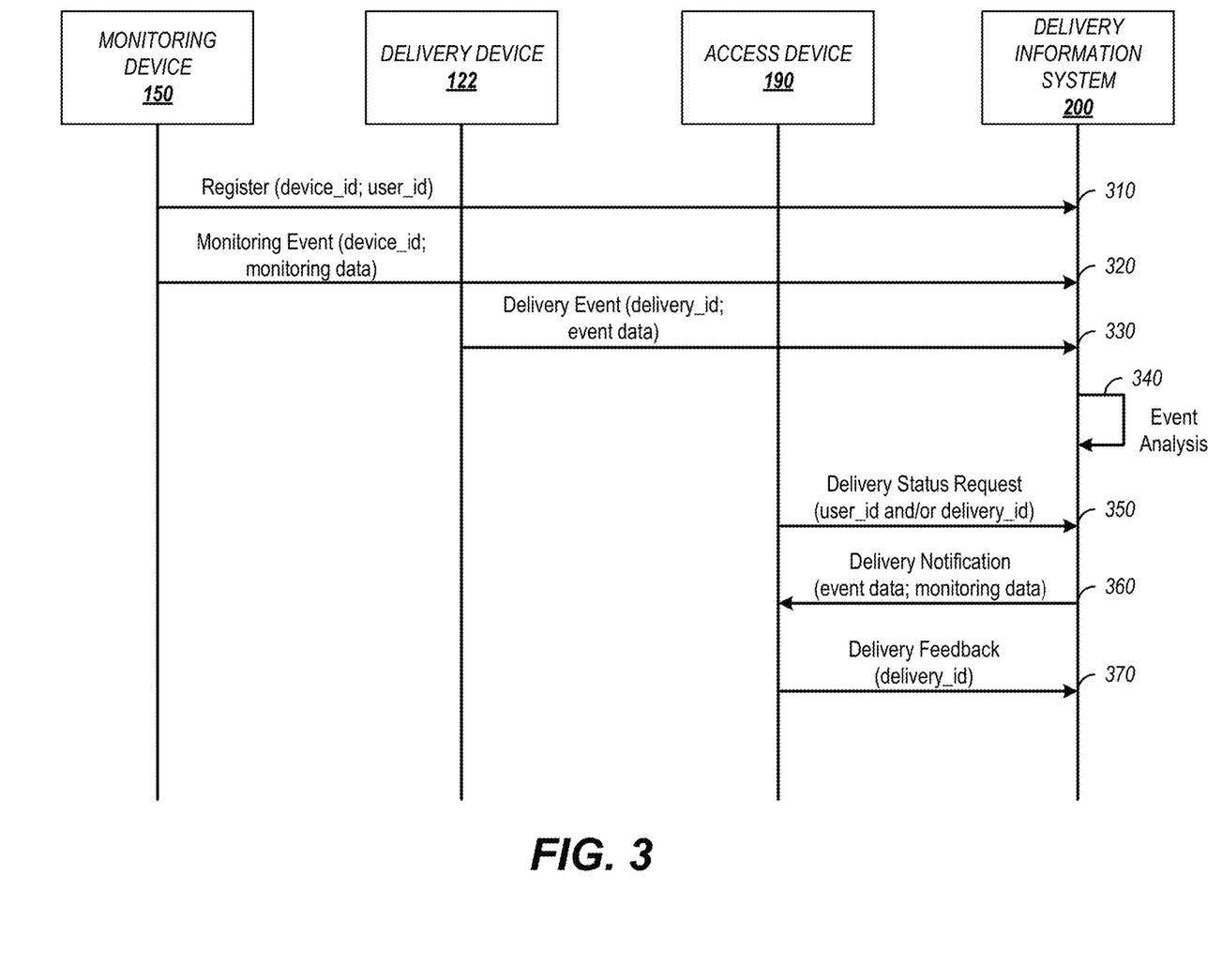
FIG. 3 is a diagram showing illustrative messaging between devices within a system for providing delivery status information.

FIG. 3 is a diagram showing illustrative messaging between devices within a system for providing delivery status information. The diagram of FIG. 3 shows messages between the monitoring device 150, the delivery device 122, the access device 192, and the delivery information system 200 such as shown in FIGS. 1 and 2. It will be appreciated that other intermediary elements may be included. For the sake of clarity, these intermediaries have been omitted from FIG. 3 as well as the description thereof.

Via message 310, the monitoring device 150 may transmit information to register the monitoring device 150. The message 310 may include an identifier for the monitoring device 150 and an identifier of the user. The message 310 may be transmitted to the delivery information system 200. The registration may be stored in a device registry as described above.

Once registered, the monitoring device 150 may begin monitoring a physical location. During the monitoring, an event may be detected. The monitoring device 150 may transmit a message 320 indicated the detected monitoring event. The message 320 may include the identifier for the monitoring device 150 along with monitoring data. The monitoring data may include temporal information indicating when the monitoring data was captured. In some implementations, this temporal information may be referred to as the capture time.

The monitoring data may include an event type. For example, the monitoring device 150 may differentiate between motion events, sound events, temperature events, or other detectable changes at the physical location. In some implementations, the monitoring data may include audio, images, or video data. The delivery information system 200 may store the monitoring event and accompanying data such as in a monitoring data store. The monitoring device 150 may provide a series of monitoring events over a period of time. This library of events may be stored in the monitoring data store for future review.

A delivery agent may utilize the delivery device 122 to transmit, via message 330, a delivery event to the delivery information system. For example, the recipient may have ordered an item via an online catalog system. The delivery agent may scan the item to indicate that the item is ready for delivery using the delivery device 122. The delivery device 122 may include an interface or other inputs to provide event data about the delivery such as updates as to the status of the delivery attempt (e.g., recipient not at physical location, physical location not accessible, wrong address, delivery declined, item damages, etc.). The message 330 may include an identifier for the delivery along with the delivery event data. The event data may also include temporal information indicating when the event occurred. Because the delivery device 122 may not be connected to a network, the temporal information associated with the event preferably reflects when the event occurred rather than when the event was transmitted.

Figure 5:
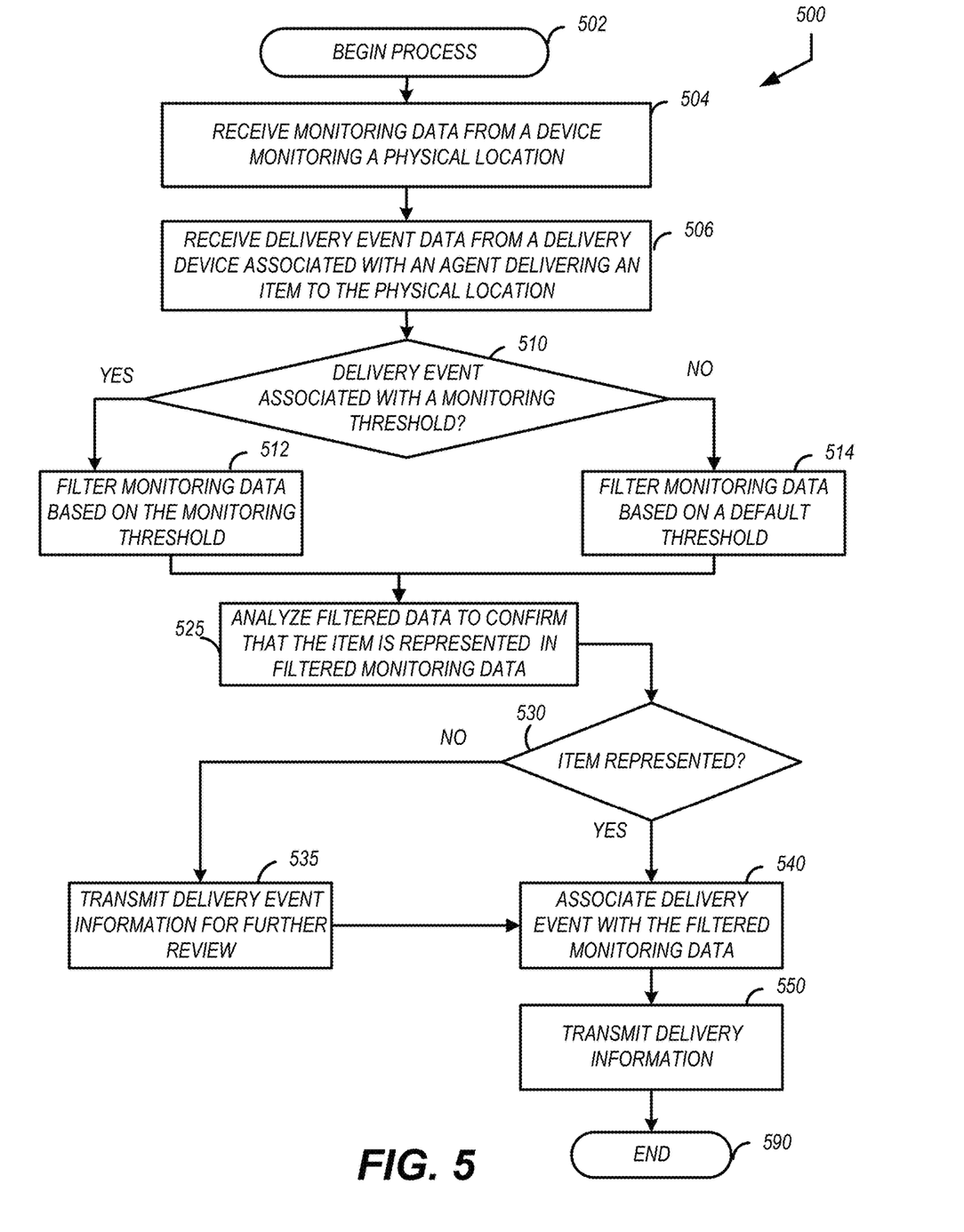
FIG. 5 is a flow diagram depicting an example method of filtering monitoring data to provide delivery status information with a portion of the monitoring data associated with a delivery.

Monitoring data may be received from the monitoring device 150 that can confirm the received delivery event data. It may be desirable to confirm delivery in situations such as unattended delivery. For example, if the delivery agent is leaving an item unattended at the physical location, it may be desirable to review monitoring data at the time near the delivery event to confirm the delivery occurred. It may be desirable to filter the monitoring data to associate only a portion of the stored monitoring data with the delivery event. The delivery information system 200 may analyze the monitoring events via messaging 340. The analysis may include tagging or adding metadata to the monitoring data to identify specific portions that relate to a delivery event. FIG. 5 provides additional details of an example method for correlating the monitoring data with a delivery event.

In the online catalog example, the online catalog system may include an interface to review deliveries and request delivery status information.

Figure 4:
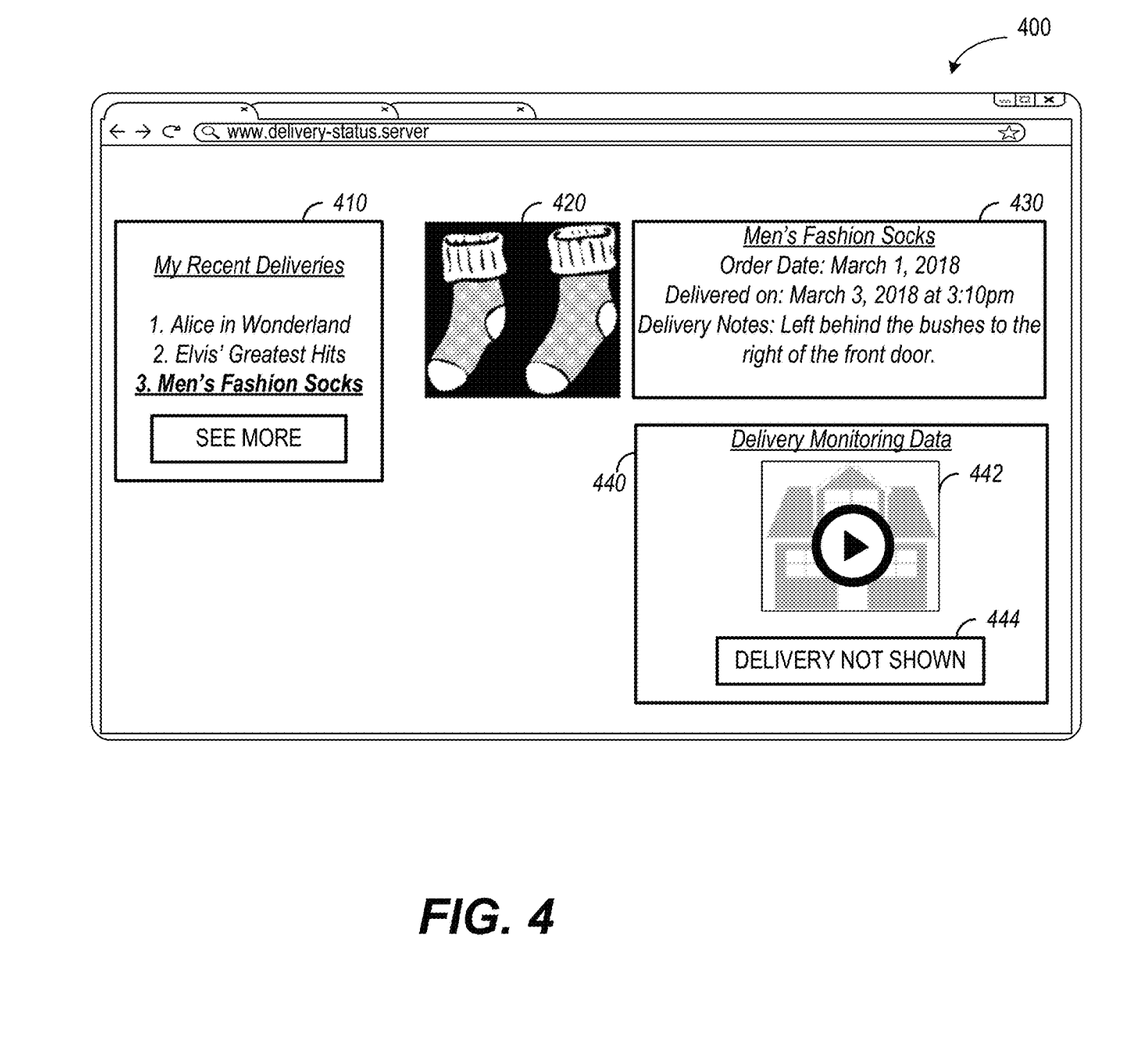
FIG. 4 is a diagram showing an illustrative interface for presenting delivery status information including monitoring data associated with a delivery.

FIG. 4 is a diagram showing an illustrative interface for presenting delivery status information including monitoring data associated with a delivery. The interface 400 is shown as a network browser interface but may be implemented as a standalone application or other module executable by an access device. The interface 400 may be presented after receiving identifying information for a user. The interface 400 includes a delivery summary 410. The delivery summary 410 may present information summarizing recent deliveries. Each listed delivery in the delivery summary 410 may be associated with a control element that, when activated such as via a click or selection, transmits a delivery status request for the delivery associated with the selected delivery. The control element may provide an identifier for the selected delivery to the delivery information system 200.

Returning to FIG. 3, an example delivery status request message 350 is shown being transmitted from the access device 192 to the delivery information system 200. The delivery status request message 350 includes at least one of a delivery identifier or a user identifier. In some implementations, the delivery status request message 350 may be an authorization message from a user to transmit delivery event information to a device associated with the user. In such instances, the delivery notification may be referred to as a push notification.

The delivery information system 200 may transmit delivery status information via message 360 to the access device 192. The delivery status information may include delivery event information such as when the item was delivered, notes from the delivery agent, or other inputs from the delivery agent responsible for the delivery. The delivery status information may also include a portion of the monitoring data associated with the delivery event as well as information about the item such as an image of the item delivered. In some implementations, the delivery status information may include a network address for a media server that can provide monitoring data. The network address may be a uniform resource locator that includes an identifier for the portion of the monitoring data associated with the delivery event.

As shown in FIG. 4, the interface includes an image of the order item 420, a delivery event information panel 430, and a monitoring data viewer 440. The delivery event information panel 430 shown the temporal information for the delivery along with notes received from the delivery agent. The delivery event information panel 430 may also include information from the catalog system such as when the order for the item was placed.

The monitoring data viewer 440 may present the portion of the monitoring data associated with the delivery event. The monitoring data viewer 440 shown includes a video player 442. The video player 442 may include a control element that can be activated to being streaming the portion of the monitoring data associated with the delivery event. In some implementations, the stream may be an audio stream or a sequence of still images or some combination of media files.

Because the portion of monitoring data presented may be automatically identified by the delivery information system 200, the interface 400 may include a feedback control element 444. The feedback control element 444 may be implemented as a button, selector, or text input element to submit feedback on the identified portion of the monitoring data. The feedback may be used to refine the delivery identification for subsequent deliveries. For example, some physical locations may have ornamental features that are mistaken for boxes. In such instances, the delivery information system 200 may incorrectly associate the delivery event with monitoring data associated with a non-delivery monitoring event. The feedback can be included during automatic identification to select a vision model that is adapted to more accurately identify the portions of the monitoring data associated with delivery events. For example, a general vision model may be used which can quickly identify portions for a majority of the instances of monitoring data. However, for physical locations where negative feedback is received, a slower but more accurate model may be used to process the monitoring data generated by a monitoring device associated with the location.

In some implementations, the feedback may include information to terminate monitoring or deregister the monitoring device with the delivery information system 200. If activated, the delivery information system 200 may delete or update information in the monitoring device registry associated with the user and monitoring device.

Returning to FIG. 3, the feedback may be transmitted via message 370 from the access device 192 to the delivery information system 200. The message 370 may include the delivery identifier to indicate to which delivery the feedback is related.

FIG. 5 is a flow diagram depicting an example method of filtering monitoring data to provide delivery status information with a portion of the monitoring data associated with a delivery. The method 500 may be implemented in whole or in part by the devices described such as the delivery information system 200. The method 500 illustrates how the monitoring data may be filtered based on a detected delivery event.

The method 500 may begin at block 502 with the assumption that an item is destine for the delivery location and the delivery agent is authorized to deliver the item. At block 504, the delivery information system 200 may receive monitoring data from a device monitoring a physical location. The monitoring data may include temporal information along with sensor data such as audio, images, video, temperature or other detectable characteristic of the physical location.

At block 506, the delivery information system 200 may receive delivery event data from a delivery device associated with an agent delivering the item to the physical location. The delivery event data may include information scanned by the delivery agent via the delivery device from the item being delivered. The delivery event data may include an identifier for the delivered item along with an event type (e.g., delivery event, delivery failure event, etc.). The delivery information system 200 may normalize received temporal information (e.g., monitoring data capture time, delivery event time, etc.) to a common time format. For example, all time may be converted to coordinated universal time. The normalized representation permits faster and more accurate comparisons between temporal values.

At block 510, the delivery information system 200 may determine whether the delivery event is associated with a monitoring threshold. The monitoring threshold may identify a size of the portion of monitoring data for presenting the delivery event. For example, for a delivery event it may be desirable to include two minutes of monitoring data whereas for a security event it may be desirable to show fifteen minutes or more of the monitoring data. The threshold may be defined using a delivery information configuration stored in memory. In some implementations, the threshold may be specific to one or more of a user, a physical location, or a monitoring device.

If the determination at block 510 is affirmative, at block 512, the delivery information system 200 may filter the monitored data to identify a portion of the monitored data corresponding to the delivery event. The portion may be selected based on a comparison of the temporal information for the video event with temporal information included in the monitoring data store. In some implementations, the temporal information for the monitoring data may be included in the monitoring event. In some implementations, the temporal information may be associated with the media file captured by the monitoring device. Once the data is located, a portion of the data corresponding to the monitoring threshold may be identified. As an example, assume the delivery event includes temporal information indicating that the event occurred on March 3 at 10:30 AM. Assume further that the monitoring threshold for the event is three minutes. In this example, the delivery information system 200 may query the monitoring data store for monitoring data associated with the user identifier that was captured on March 3. Using the time information associated with the monitoring data, the delivery information system 200 may identify a starting point for the portion at 10:30 AM. In some implementations, a tolerance may be included to ensure that monitoring data preceding the event and occurring after the event are included in the identified portion to be associated with the delivery event. The tolerance may be specified in a delivery status configuration. The tolerance may be a default for all users or specific to one or more of a user, an event type, a location, or a monitoring device. Having identified the starting point for the portion of the monitoring data, the delivery information system 200 may then specify the end of the portion by incrementing the start point by the monitoring threshold.

Returning to block 510, if the delivery event is not associated with a monitoring threshold, at block 514, a default monitoring threshold may be used to select a predetermined portion of the monitoring data. The selection may be similar to that described with reference to block 512.

At block 525, the delivery information system 200 may analyze the filtered data to confirm that the item is represented in the portion of the monitoring data. The analysis may include image analysis of the monitoring data to detect an object corresponding to a delivered item. In some implementations, the delivery event may include dimensions of item being delivered. The dimensions may be provided as an input to the image analysis. The object detection may include selecting a computer vision model trained to detect delivery items from one or more images. The model may receive, as inputs, image data and, in some implementations, estimated dimensions of the delivered item. The model may provide as an output detection information indicating whether an object (e.g., a delivered item) is shown in the images provided to the model. The output information may include a detection result indicating a likelihood that an image shows an item associated with the delivery event.

The analysis result may be used at block 530 to determine whether the item is represented in the monitoring data. The determination may compare an output value from the model to a detection threshold. The threshold may be absolute (e.g., above X or below Y) or represented as a range (e.g., between X and Y). If the determination is affirmative, at block 540, the delivery information system 200 may associate the delivery event with the filtered monitoring data. Associating the delivery event with the filtered monitoring data may include creating metadata or a tag for the monitoring data linking the portion with the delivery event. In some implementations, the associating may include creating a record that links the delivery event to the identified portion.

If the determination at block 530 is negative, the method 500 may proceed to block 535 to transmit the delivery event information for further review. For example, the delivery event information may be provided to a review system such as an image review system. The review system may include sophisticated machine learning models (e.g., a vision model for image monitoring data, an acoustic model for audio monitoring data, or a thermal model for thermal monitoring data) or interfaces to examine the monitoring data along with the delivery event data. In some instances, the failure may be due to poor image recognition. In some instances, the failure may be due to an improper delivery (e.g., item left in an inappropriate location or unauthorized removal of the item from the physical location). In some implementations the further review may include retraining machine vision models. For example, it may be desirable to create a training set of monitoring data that could not be accurately analyzed by an existing vision model. These may be used to train the vision model to improve accuracy. The further review may provide an association between the delivery event and the filtered monitoring data. The result of the review may be used at block 540 to associate the delivery event as described above.

At block 550, the delivery information system may transmit the delivery information. In some implementations, the transmission may be to a device associated with a recipient of an item associated with the delivery event. In some implementations, the transmission may be to a device associated with a sender or carrier of the item. The transmission may be based on a prior subscription for delivery event information. In some implementations, the transmission may be based on a request from a user. The transmission may include information to produce a graphical user interface such as that shown in FIG. 4.

The method 500 may end at block 590. The method 500 ensures accurate filtering and identification of a relevant portion of the monitoring data that corresponds with a delivery event.

Figure 6:
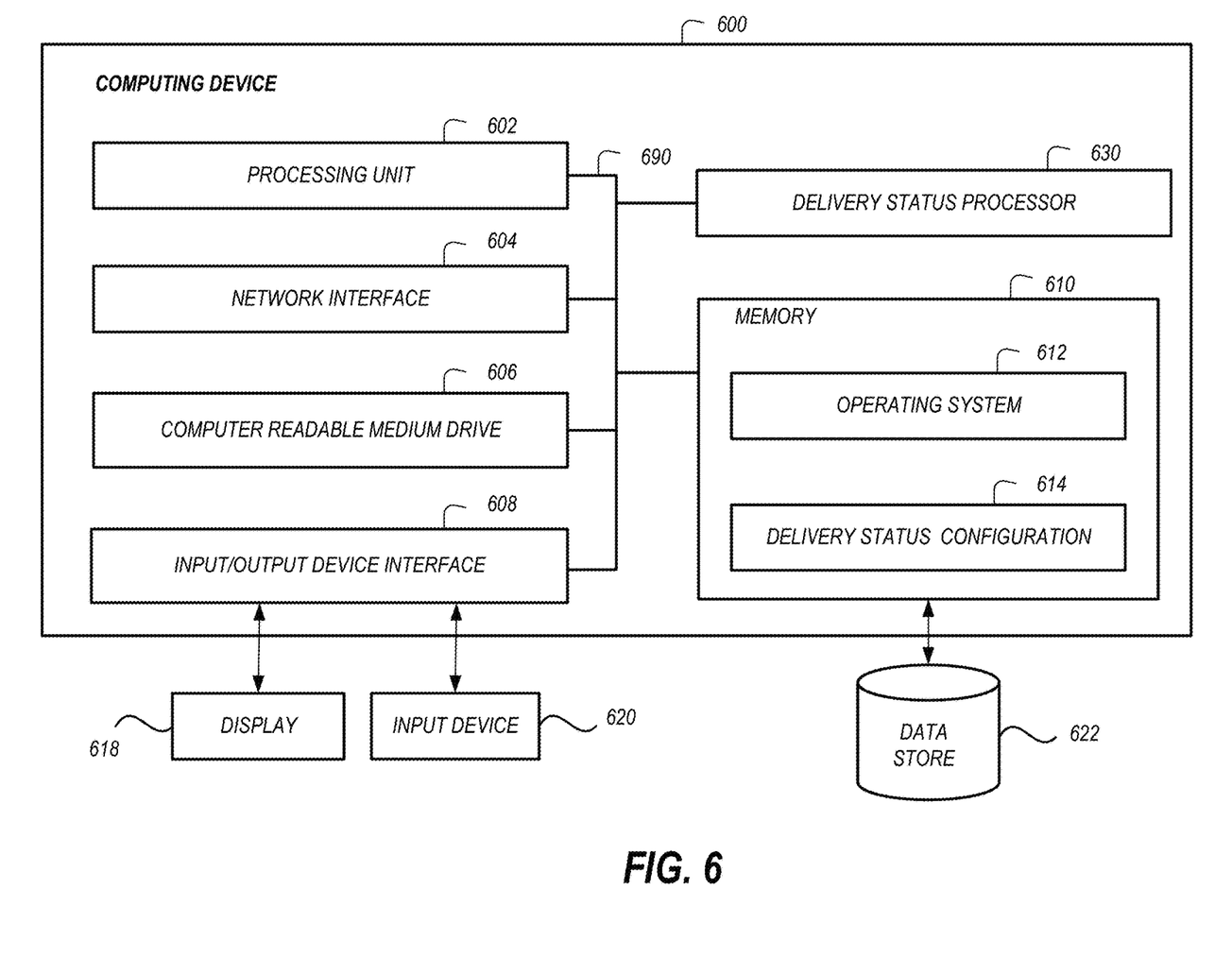
FIG. 6 is a block diagram of an illustrative computing device that may implement one or more of the delivery status features described.

FIG. 6 is a block diagram of an illustrative computing device that may implement one or more of the access control features described. The computing device 600 may implement the method or messaging shown in of FIG. 3 or 5 or generate the interface shown in FIG. 4. The computing device 600 can be a server or other computing device, and can comprise a processing unit 602, a delivery status processor 630, a network interface 604, a computer readable medium drive 606, an input/output device interface 608, and a memory 610. The network interface 604 can provide connectivity to one or more networks or computing systems. The processing unit 602 can receive information and instructions from other computing systems or services via the network interface 604. The network interface 604 can also store data directly to memory 610. The processing unit 602 can communicate to and from memory 610 and output information to an optional display 618 via the input/output device interface 608. The input/output device interface 608 can also accept input from the optional input device 620, such as a keyboard, mouse, digital pen, microphone, mass storage device, etc.

The memory 610 contains computer program instructions that the processing unit 602 executes in order to implement one or more embodiments. The memory 610 may include RAM, ROM, and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes a delivery status configuration 614. The delivery status configuration 614 may include the thresholds, tolerances, authentication information (e.g., encryption keys, tokens, device identifiers etc.), or other predetermined or configurable values described herein. The delivery status configuration 614 may store specific values for a given configuration. The delivery status configuration 614 may, in some implementations, store information for obtaining values for a given configuration element. For example, a monitoring device registry may be specified as a network location (e.g., URL) in conjunction with username and password information to access the network location to obtain or verify information associated with a monitoring device or property thereof (e.g., location, capabilities, event types, monitoring data types, etc.). The delivery status configuration 614 may be used by the delivery status processor 630 to implement one or more of the aspects described herein. In some implementations, the delivery status processor 630 may include specific computer executable instructions that cause the computing device 600 to perform one or more of the delivery status features described.

The memory 610 may also include or communicate with one or more auxiliary data stores, such as data store 622. The data store 622 may electronically store data regarding the item, the delivery agent, the delivery device, the delivery location, monitoring devices, monitoring data, and the like.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 600 may not be coupled to the display 618 or the input device 620. In some embodiments, two or more computing devices 600 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A delivery information device (e.g. delivery information system) can be or include a microprocessor, but in the alternative, the delivery information device can be or include a controller, microcontroller, or state machine, combinations of the same, or the like configured to efficiently process and present event data for delivery of an item. A delivery information device can include electrical circuitry configured to process computer-executable instructions. Although described herein primarily with respect to digital technology, a delivery information device may also include primarily analog components. For example, some or all of the filtering algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a delivery information device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the delivery information device such that the delivery information device can read information from, and write information to, the storage medium. In the alternative, the storage medium can be integral to the delivery information device. The delivery information device and the storage medium can reside in an application specific integrated circuit (ASIC). The ASIC can reside in an access device or other delivery information device. In the alternative, the delivery information device and the storage medium can reside as discrete components in a filtering device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT®.NET®, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A computer-implemented method comprising:
under control of one or more processing devices,
receiving, from an image capturing device, captured image data for a monitored location;
receiving, from a delivery system, delivery information for an item delivered at the monitored location, wherein the delivery information includes: (i) an identifier for the monitored location; and (ii) temporal information indicating when the item was delivered at the monitored location;
identifying a portion of the captured image data showing delivery of the item, wherein identifying the portion of the captured image data comprises:
identifying a monitoring threshold, wherein the monitoring threshold corresponds to the identifier for the monitored location, and wherein the monitoring threshold identifies a desired size of the portion of the captured image data,
determining a starting point, in the captured image data, of the portion of the captured image data based at least in part on the temporal information indicating when the item vas delivered at the monitored location, identifying the portion of the captured image data based at least in part on the starting point in the captured image data, and determining that a size of the portion of the captured image data satisfies the desired size of the portion of the captured image data; and transmitting the portion of the captured image data to a device associated with the monitored location.

2. The computer-implemented method of claim 1, further comprising:

storing the captured image data in an image repository;

generating metadata associating the portion of the captured image data with the delivery information; and storing the metadata using at least one of (i) the image repository, or (ii) the delivery system.

3. The computer-implemented method of claim 1, further comprising:

receiving, from the device associated with the monitored location, a request for information about the delivery of the item, wherein the request includes a delivery identifier for the delivery, wherein the delivery information is received based at least in part on the delivery identifier, and wherein the identifying the portion of the captured image data is performed after receipt of the request.

4. The computer-implemented method of claim 1, further comprising:

indexing the captured image data by capture time, wherein a capture time indicates when an associated portion of the captured image data was captured, and wherein the capture time is associated with a first time format;

converting the temporal information to generate a normalized representation of the temporal information that conforms with the first time format;

querying the captured image data using the normalized representation of the temporal information; and receiving the portion of the capture image data in response to the querying.

5. A computer-implemented method comprising:

under control of one or more processing devices, receiving, from a monitoring device, monitoring data for a physical location;

receiving, from a first communication device, delivery event information for the physical location, wherein the delivery event information includes: (i) an identifier for the physical location; and (ii) temporal information indicating when a delivery event occurred at the physical location;

receiving, from a second communication device associated with the physical location, a request for a portion of the monitoring data showing the delivery event, wherein the request includes the identifier for the physical location;

identifying the portion of the monitoring data showing the delivery event, wherein identifying the portion of the monitoring data comprises:

identifying, from the monitoring data, a first period of time, wherein the first period of time corresponds to the identifier for the physical location, determining a starting point, in the monitoring data, of a second period of time corresponding to the temporal information indicating when the delivery event occurred, incrementing the starting point, in the monitoring data, of the second period of time by the first period of time, and identifying the portion of the monitoring data corresponding to the second period of time based at least in part on incrementing the starting point, in the monitoring data, of the second period of time by the first period of time; and transmitting the portion of the monitoring data to the second communication device.

6. The computer-implemented method of claim 5, further comprising:

storing the monitoring data in a monitoring data repository;

generating metadata associating the portion of the monitoring data with the delivery event information; and storing the metadata using at least one of (i) the monitoring data repository, or (ii) the first communication device.

7. The computer-implemented method of claim 6, wherein identifying the portion of the monitoring data is based at least in part on a comparison between the temporal information and the metadata.

8. The computer-implemented method of claim 6, further comprising:

receiving authorization information from the second communication device, the authorization information indicating that the one or more processing devices may access the delivery event information; and transmitting at least a portion of the authorization information to the first communication device, wherein the monitoring data is received in response to transmitting the at least a portion of the authorization information.

9. The computer-implemented method of claim 5, further comprising:

indexing the monitoring data by capture time, wherein a capture time indicates when an associated portion of the monitoring data was captured, and wherein the capture time is associated with a first time format;

converting the temporal information to generate normalized representation of the temporal information that conforms with the first time format;

querying the monitoring data using the normalized representation of the temporal information; and receiving the portion of the monitoring data in response to the querying.

10. The computer-implemented method of claim 5, wherein the portion of the monitoring data includes an image, and wherein the computer-implemented method further comprises:

generating a detection result indicating a likelihood that the image shows an item associated with the delivery event; and determining that the detection result corresponds to a detection threshold.

11. The computer-implemented method of claim 10, further comprising:

determining that an initial detection result does not correspond to the detection threshold;

transmitting the image to an image review system; and receiving, from the image review system, the detection result.

12. The computer-implemented method of claim 5, wherein the first period of time identifies a desired size of the portion of the monitoring data.

13. A system comprising:
a computer-readable memory storing specific computer-executable instructions; and
one or more computer processors in communication with the computer-readable memory, wherein the one or more computer processors are configured to execute the specific computer-executable instructions to at least:
  receive, from a first device, monitoring data for a physical location;
  receive, from a second device, delivery event information for the physical location, wherein the delivery event information includes: (i) an identifier for the physical location; and (ii) temporal information indicating when a delivery event occurred at the physical location;
  receive, from a third device associated with the physical location, a request for a portion of the monitoring data showing the delivery event, wherein the request includes the identifier for the physical location;
  identify the portion of the monitoring data showing the delivery event, wherein to identify the portion of the monitoring data, the one or more computer processors are configured to execute the specific computer-executable instructions to at least:
    identify a monitoring threshold, wherein the monitoring threshold corresponds to the identifier for the physical location,
    determine a starting point, in the monitoring data, of the portion of, the monitoring data based at least in part on the temporal information indicating when the delivery event occurred,
    determine an ending point, in the monitoring data, of the portion of the monitoring data based at least in part on the monitoring threshold and the starting point in the monitoring data, and
    identify as the portion of the monitoring data, the monitoring data between the starting point of the monitoring data and the ending point of the monitoring data; and
  transmit the portion of the monitoring data to the third device.

14. The system of claim 13, wherein the one or more computer processors are configured to execute further specific computer-executable instructions to at least:
  store the monitoring data in a monitoring data repository;
  generate metadata associating the portion of the monitoring data with the delivery event information; and
  store the metadata using at least one of (i) the monitoring data repository, or (ii) the second device.

15. The system of claim 14, wherein the one or more computer processors are configured to execute further specific computer-executable instructions to at least:
  receive authorization information from the third device, the authorization information indicating that the one or more computer processors may access the delivery event information; and
  transmit at least a portion of the authorization information to the second device, wherein the monitoring data is received in response to transmitting at least a portion of the authorization information.

16. The system of claim 13, wherein the one or more computer processors are configured to execute further specific computer-executable instructions to at least:
  index the monitoring data by capture time, wherein a capture time indicates when an associated portion of the monitoring data was captured, and wherein the capture time is associated with a first time format;
  convert the temporal information to generate a normalized representation of the temporal information that conforms with the first time format;
  query the monitoring data using the normalized representation of the temporal information; and
  receive the portion of the monitoring data in response to the querying.

17. The system of claim 13, wherein the portion of the monitoring data includes an image, and wherein the one or more computer processors are configured to execute further specific computer-executable instructions to at least:
  generate a detection result indicating a likelihood that the image shows an item associated with the delivery event; and
  determine that the detection result corresponds to a detection threshold.

18. The system of claim 17, wherein the one or more computer processors are configured to execute further specific computer-executable instructions to at least:
  determine that an initial detection result does not correspond to the detection threshold;
  transmit the image to an image review system; and
  receive, from the image review system, the detection result.

19. The system of claim 13, wherein to identify the portion of the monitoring data, the one or more computer processors are configured to execute farther specific computer-executable instructions to at least:
  identify a tolerance, wherein the tolerance corresponds to the physical location, the tolerance identifying a first period of monitoring data preceding the starting point in the monitoring data and a second period of monitoring data occurring after the ending point in the monitoring data, wherein the starting point of the portion of the monitoring data further corresponds to the first period of monitoring data and the ending point of the portion of the monitoring data further corresponds to the second period of monitoring data.

20. The system of claim 13, wherein the monitoring threshold identifies a desired size of the portion of the monitoring data.

* * * * *

UNITED STATES PATENT AND TRADEMARK OFFICE
CERTIFICATE OF CORRECTION

PATENT NO. : 10,922,349 B1  
APPLICATION NO. : 15/955463  
DATED : February 16, 2021  
INVENTOR(S) : Wendy M. Harris It is certified that error appears in the above-identified patent and that said Letters Patent is hereby corrected as shown below:

In the Specification

In Column 13, Line 60, delete "of" and insert --of:--.

In the Claims

In Column 14, Line 66, Claim 1, delete "vas" and insert --was--.

In Column 15, Line 14 (approx.), Claim 2, delete "of (i)" and insert --of: (i)--.

In Column 16, Line 18 (approx.), Claim 6, delete "of (i)" and insert --of: (i)--.

In Column 17, Line 28 (approx.), Claim 13, delete "of," and insert --of--.

In Column 17, Line 47, Claim 14, delete "of (i)" and insert --of: (i)--.

In Column 18, Line 39 (approx.), Claim 19, delete "farther" and insert --further--.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*